(12) United States Patent
Gustafsson et al.

(10) Patent No.: US 10,494,959 B2
(45) Date of Patent: Dec. 3, 2019

(54) CAMSHAFT WITH DETACHABLE BEARING JOURNALS

(75) Inventors: Reine Gustafsson, Jönköping (SE); Fredrik Andersson, Göteborg (SE)

(73) Assignee: AGAP HB, Taberg (SE)

( * ) Notice: Subject to any disclaimer, the term of this patent is extended or adjusted under 35 U.S.C. 154(b) by 621 days.

(21) Appl. No.: 13/697,001

(22) PCT Filed: May 11, 2011

(86) PCT No.: PCT/SE2011/000081
§ 371 (c)(1),
(2), (4) Date: May 29, 2013

(87) PCT Pub. No.: WO2011/155885
PCT Pub. Date: Dec. 15, 2011

(65) Prior Publication Data
US 2013/0269474 A1    Oct. 17, 2013

(30) Foreign Application Priority Data

May 11, 2010    (SE) ........................................ 1000483

(51) Int. Cl.
*F01L 1/047* (2006.01)
*F16C 35/02* (2006.01)

(52) U.S. Cl.
CPC .............. *F01L 1/047* (2013.01); *F16C 35/02* (2013.01); *Y10T 74/2101* (2015.01)

(58) Field of Classification Search
CPC .... F01L 13/00; F01L 2013/0052; F01L 1/047
USPC .................. 74/567; 123/90.27, 90.6
See application file for complete search history.

(56) References Cited

U.S. PATENT DOCUMENTS

| | | | |
|---|---|---|---|
| 2,552,724 A | | 5/1951 | Lang |
| 4,441,243 A | | 4/1984 | Stojek |
| 5,048,366 A | * | 9/1991 | Spanio ..................... F16H 53/02 123/90.34 |
| 5,186,129 A | * | 2/1993 | Magnan .................. F01L 1/047 123/90.33 |
| 5,253,546 A | * | 10/1993 | Elrod et al. ...................... 74/567 |
| 5,348,210 A | * | 9/1994 | Linzell ......................... 228/115 |
| 5,605,077 A | | 2/1997 | Tsunoda et al. |
| 6,199,522 B1 | * | 3/2001 | Regueiro ................... 123/90.15 |
| 6,244,229 B1 | * | 6/2001 | Nakano ................. F01L 1/0532 123/90.15 |
| 6,591,713 B2 | * | 7/2003 | Jesel ....................... F01L 1/047 123/90.6 |
| 7,540,267 B1 | * | 6/2009 | Sellars ........................ 123/90.31 |

(Continued)

FOREIGN PATENT DOCUMENTS

| | | | |
|---|---|---|---|
| DE | 1010323 B | 6/1957 | |
| DE | 2706021 A1 | * 8/1977 | .............. F01L 1/047 |

(Continued)

OTHER PUBLICATIONS

English Abstract of DE 3317019 A1, Heinz, Nov. 1984.*

(Continued)

*Primary Examiner* — Vinh Luong
(74) *Attorney, Agent, or Firm* — Richard W. James (57) ABSTRACT

A camshaft and methods of installing a camshaft, the camshaft having at least one detachable bearing journal to enable varied camshaft designs to be assembled into an engine.

10 Claims, 7 Drawing Sheets

(56) References Cited

U.S. PATENT DOCUMENTS

| | | | |
|---|---|---|---|
| 2002/0073546 A1* | 6/2002 | Thompson | 29/898 |
| 2002/0117020 A1* | 8/2002 | Novak | F01L 1/047 74/567 |
| 2003/0072508 A1* | 4/2003 | Astner | 384/433 |
| 2005/0045130 A1* | 3/2005 | White | F01L 1/047 123/90.17 |
| 2005/0084192 A1 | 4/2005 | Takeo et al. | |
| 2006/0075984 A1* | 4/2006 | Goracy | 123/90.27 |
| 2008/0240641 A1* | 10/2008 | Waseda | F01L 1/047 384/551 |
| 2008/0283018 A1* | 11/2008 | Sakurai | B21D 53/845 123/195 R |
| 2009/0241871 A1* | 10/2009 | Hibino et al. | 123/90.6 |
| 2009/0308338 A1* | 12/2009 | Tashiro | 123/90.6 |
| 2010/0064995 A1* | 3/2010 | Sato | 123/90.17 |
| 2010/0065010 A1* | 3/2010 | Abe | F01L 1/04 123/195 A |
| 2011/0197839 A1* | 8/2011 | Yoshika et al. | 123/90.17 |
| 2011/0226200 A1* | 9/2011 | Trease | 123/54.4 |

FOREIGN PATENT DOCUMENTS

| | | | | |
|---|---|---|---|---|
| DE | 3317019 A1 | * | 11/1984 | F01L 1/047 |
| EP | 1057979 A2 | * | 12/2000 | F01L 1/047 |
| EP | 1956222 B1 | | 5/2009 | |
| GB | 2467334 | * | 8/2010 | F01L 1/047 |
| JP | 51097604 U | | 8/1976 | |
| JP | 61108516 U | | 7/1986 | |
| JP | 2009030468 A | | 2/2009 | |
| JP | 2009127804 A | | 6/2009 | |

OTHER PUBLICATIONS

PTO Translation of JP 61-108516, Tanaka, Jul. 1986.*
EPO Machine Translation of EP 1956222, Helmut, Aug. 2008.*
International Search Report issued in counterpart PCT application No. PCT/SE2011/000081, dated Aug. 31, 2011.

* cited by examiner

CAMSHAFT WITH DETACHABLE BEARING JOURNALS

TECHNICAL FIELD

The invention relates to a camshaft for an internal combustion engine with a camshaft design requiring the camshaft to be assembled into the engine through the camshaft support bearings.

BACKGROUND

A common design for built in camshafts in internal combustion engines is to allow the camshaft to rest on fixed bearings, either in the engine block or in the cylinder head. When the camshaft is assembled into the engine it is inserted through the fixed camshafts bearings, which have the same diameter as the camshaft bearing journals. This is foremost a very common design on engines with a push rod valve train, but can be found on other types of valve trains, for instance side valve engines.

Designs following the guidelines as mentioned above will result in limitations on how the camshafts lobes on the camshaft can be designed when located close to the camshaft bearing journals. The largest radius on the camshaft lobe cannot be allowed to be larger than the radius of the camshaft bearing journal, since it then would be impossible to insert the camshaft through the camshaft bearings.

By designing the camshaft bearing journals as detachable details assembled on the camshaft at the same time or after the camshaft is assembled into the engine, it becomes possible to radially displace the camshaft during assembly into the engine, which hence makes it possible to design camshaft lobes with a larger radius than the camshaft bearing journals.

There are earlier examples of camshafts designed in several separate sections. In DE 2706021 A1, aimed at large internal combustion engines where it, for handling and assembly reasons, is an advantage to split the camshaft in several smaller parts. To be able to apply this type of design on smaller engines with corresponding smaller camshafts, new solutions for assembling the parts of the camshaft together are needed, otherwise these details will strongly limit the earlier described advantages.

In U.S. Pat. No. 2,552,754A another divided camshaft design is described. This is however a design that still limits the design of the camshaft lobes according to the camshaft bearing journals. Hence this design does not solve the problem referred to herein.

When designing a completely new engine with the purpose of a simple and low cost solution, a design with fixed camshaft bearings is very attractive. The dimensions of the camshaft bearings are then adapted after the intended design of the camshaft lobes. A design with detachable camshaft bearing journals would then most likely be counter-productive since it complicates the design and makes it all but simple. If the designer would need larger camshaft lobes he would instead make the camshaft bearings larger, or choose a design with detachable camshaft bearing caps, which means the camshaft does not have to be inserted through the camshaft bearings during assembly, and the problem is avoided.

This invention is therefore best suited when the radius of the camshaft lobes needs to be increased on an existing engine, usually for performance reasons. The skilled professional presented with this problem today solves it by modifying the engine by increasing the camshaft bearings and correspondingly increasing the camshaft bearing journals. This solution is limited by the available space in the existing design and complicates other qualities of the engine. Another solution used is to machine an axial notch in the camshaft bearings, where the tip of the camshaft lobes can be inserted. This design also has a negative impact on other engine properties.

These are solutions that allow for only minor increase of the radius of the camshaft lobes that, in addition, require modification to camshaft bearings and other parts.

The invention distinguishes itself from the described designs of divided camshafts by the fact that it has to be assembled together at the same time it is inserted into the engine. Thus, one must already, when designing the camshaft, have in mind in which order the parts should be assembled, to take advantage of the design. The main purpose of the earlier designs has been to divide large camshafts into smaller and more manageable details to ease manufacturing and assembly into the engine.

The main purpose of this invention is to enable camshaft lobes with a larger radius than the radius of the camshaft bearing journals to be designed. To achieve this purpose in the best way, it demands the details of the design to differ from already available solutions.

PURPOSE OF THE INVENTION

The purpose of this invention is to make it possible to insert a camshaft with camshaft lobes that has a larger radius than the camshaft bearing journals through the fixed camshaft support bearings in the engine. This is made possible by making the camshaft bearing journals detachable, and/or the camshaft divided in a way so it is not assembled together until it is inserted into the engine.

This design makes it possible to use camshaft lobes larger than what would normally be possible for a given engine model with a camshaft designed in one piece.

SUMMARY

The invention relates to a camshaft for a small internal combustion engine used in, for example, cars or motorbikes. It is characterized by being divided into two or more components, and preferably it is the camshaft bearing journals on the camshaft that are separate components.

With a camshaft in one piece the camshaft lobes cannot have a larger radius than the camshaft bearing journals if the camshaft is to be inserted through the camshaft support bearings in the engine. The bearing journals will then limit the design and height of the camshaft lobes.

By designing the camshaft divided in separate components to be assembled at the same time or after the camshaft has been inserted into the engine, it is possible to insert the camshaft, radially displaced, through the camshaft support bearings. This makes it possible to design the camshaft lobes larger than what would otherwise be possible for a given dimension of the support bearings.

The invention relates to designs where the joining of the camshaft components is made by a joint in the axial center of the camshaft to minimize the influence on the outer dimension of the camshaft. This is extra important on small camshafts divided into separate components, where the design can have a large impact and limit the intended advantages with the design if not done right.

DESCRIPTION OF THE FIGURES

FIGS. 8 *a-e* show how to assemble a divided camshaft with two detachable bearing journals and two camshaft lobes;

FIGS. 9 *a-c* shows an alternative way of assemble a divided camshaft with two bearing journals;

FIGS. 10 *a-e* show the design and how to assemble a radially divided bearing journal, the view to the left showing the design in axial, the one to the left from the side; and FIGS. 11 *a-c* show an alternative way of assembling a radial divided camshaft bearing journal.

The same numbers on the different drawings refer to the same corresponding parts.

DETAILED DESCRIPTION

Figure 1:
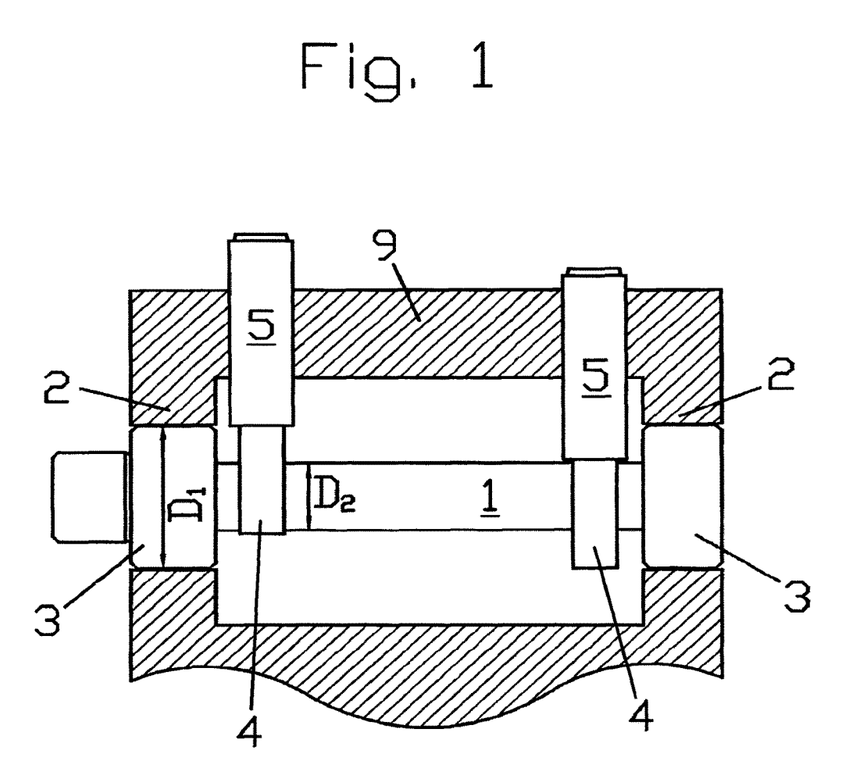
FIG. 1 shows a schematic view of a camshaft with two camshaft bearing journals and two camshaft lobes resting on two fixed camshaft bearings, with lifters resting on the camshaft lobes.
Figure 2:
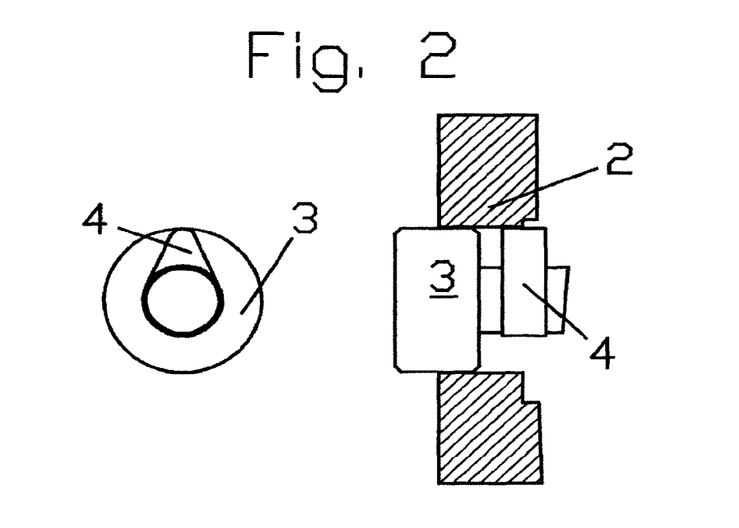
FIG. 2 shows a camshaft lobe, the camshaft bearing journal and the geometrical relationship which limits the radius of the camshaft lobe to not being larger than the radius of the camshaft bearing journal, when the camshaft is inserted through the fixed camshaft bearing.

FIG. 1 shows a camshaft (1) in its most basic design with two bearing journals (3) and corresponding camshaft bearings (2) in the engine (9). The camshaft (1) also consists of two camshaft lobes (4). The camshaft (1) is manufactured in one piece and when assembled into the engine (9) is inserted through the camshaft bearing (2), which has the same inner diameter as the camshaft bearing journal's (3) outer diameter $D_1$ FIG. 2 explains the limitation in camshaft lobe (4) design when the lobe is placed close to the bearing journal (3). The maximum radius of the camshaft lobe can then not be allowed to exceed the radius of the bearing journal (3), hence it would be impossible to insert the camshaft lobe (4) through the support bearings (2) of the engine (9).

Figure 3:
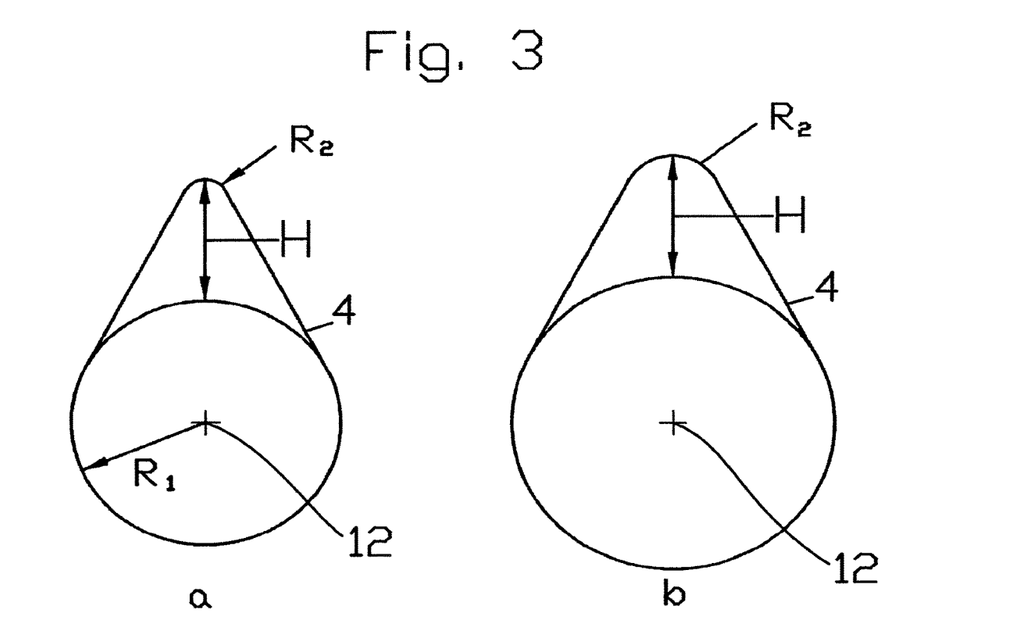
FIG. 3 shows two camshaft lobes with different radius base circles and the same lobe lift.

A camshaft lobe (4) can be explained according to the nomenclature in FIG. 3 with a base circle with radius $R_1$ and a lobe (4) with a given height H. The top radius of each lobe (4), in most cases corresponding to the smallest radius, are described as $R_2$. The axial centerline 12 through the base circle of the camshaft lobe (4) is corresponding to the axial centerline 12 through the camshaft bearing journal (3).

To allow for a camshaft (1) to be inserted through a camshaft support bearing (2) with inner diameter $D_1$, the following criteria need to be fulfilled:

$$2 \times R_1 + 2 \times H \le D_1 \quad \text{formula (1)}$$

When designing an engine (9) it is, due to weight and space reasons, desirable to keep $D_1$ as small as possible. This limits the degree of freedom in the design of the camshaft lobe (4). When increasing H within a given $D_1$, $R_1$ must be reduced correspondingly to fulfill the criteria described in formula 1.

If the reduction of the base circle is large the diameter of the camshaft $D_2$, will need to be reduced between lobes and bearing journals. Since the base circle of the camshaft lobe (4) has to be larger than the surrounding diameter, the following criteria are given:

$$D_2 \le 2 \times R_1 \quad \text{formula (2)}$$

A thinner camshaft (1) will have negative impact on camshaft stiffness, which in turn will affect the dynamic function of the valve train.

A reduced base circle will also deteriorate the geometry of the camshaft lobe (4) as described in FIG. 3, where two camshaft lobes (4) can be seen with identical H, and hence will produce the same valve lift regardless of the fact that (b) has a larger base circle than (a). In the comparison between these lobes there is a major difference in the top radius $R_2$.

If the radius $R_1$ is increased, $R_2$ will also increase with the same amount which in turn will result in a larger contact area between the camshaft lobe (4) and the follower (5), resulting in reduced surface stress and improved durability.

When an existing camshaft design is about to be modified, commonly with the purpose to increase H in order to increase the achievable valve lift, $D_1$ strongly limits the design of the camshaft lobe (4). One solution is to increase $D_1$, but that would also mean that the diameter of the camshaft support bearings (2) in the engine (9) have to be increased, which most often is complicated or even impossible.

Designing a completely new engine (9) will allow for a larger degree of freedom, but the drawbacks with increased weight and need of space still remains if the camshaft (1) is designed with larger camshaft bearing journals (3).

Figure 4:
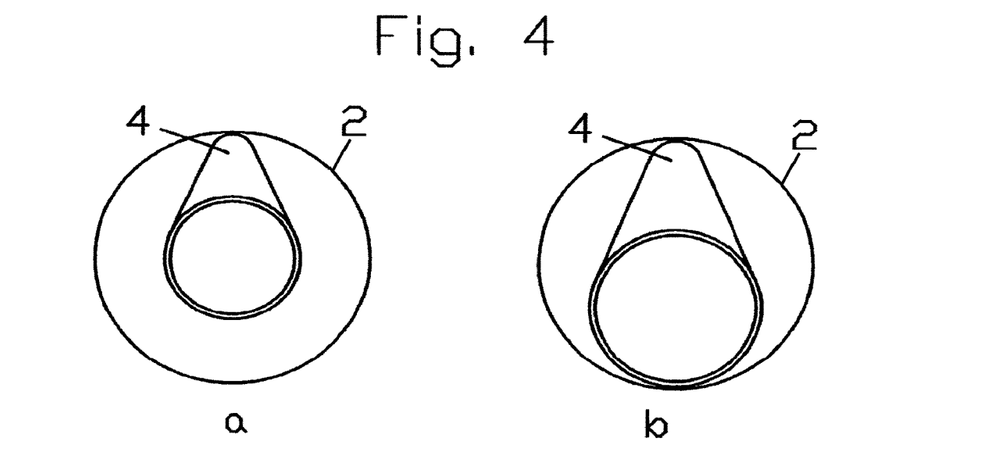
FIG. 4 shows a schematic comparison between how large a camshaft lobe can be inserted through a given camshaft bearing, on one hand when the camshaft lobe base circle is in the center of the camshaft bearing and on the other hand when it is possible to displace the base circle from the center and use all of the space of the camshaft bearing.

The invention refers to making the camshaft bearing journals (32) detachable and assembled with the camshaft (1) at the same time, or after the camshaft (1) has been inserted into its position in the engine (9). The advantage is, that when the camshaft (1) is inserted through the camshaft support bearings (2) without the camshaft bearing journals (3) in place the camshaft (1) can be radially displaced. FIG. 4*a* shows the traditional way of assembly, when the centerline of the camshaft lobe base circle has to be maintained in the center of the camshaft support bearing (2). FIG. 4*b* shows how much larger the camshaft lobe (4) can be made if the centerline of the camshaft lobe base circle can be displaced and all the space in $D_1$ can be utilized. This improves the criteria described in formula 1 as follows:

$$2 \times R_1 + H \le D_1 \quad \text{formula (3)}$$

Compared to the criteria of formula (1) there is an extra H in space that can be utilized to increase H or/and $R_1$, with the corresponding advantages described earlier.

To be able to utilize the advantages with detachable bearing journals to its full potential, it is important that the assembly of the included components is designed in such a way that the means of attachment do not expand on the outside of the camshaft (1), since that will limit the amount it can be radially displaced during assembly.

The solution suggested is to utilize a simple joint in the axial center of the camshaft (1). Since such a joint would eliminate details on the outer surfaces of the camshaft (1), it will maximize the amount the camshaft (1) can be radially displaced when inserted through the camshaft support bearings (2) and, hence, also maximize the achievable radius of the camshaft lobe (4) with respect to the diameter of the camshaft support bearing (2).

With this solution it is possible that the fastening joint becomes the largest or longest component of the camshaft (1). This would not have been desirable if the purpose of the design would have been to design the camshaft (1) divided to achieve smaller and more easily handled components. This is of small relevance though in the applications this invention aims at, namely when the size of the camshaft (1) is not the problem, instead it is the design of the camshaft lobe (4) that is.

If only a central fastening joint is used, it becomes necessary that the components of the camshaft (1) are fixed angularly towards each other. This is most easily done by feather keys, splines 16, or some kind of pin 14.

The centrally placed joint also makes the design simple, with as few details as possible.

FIG. 8a is an example of how to assemble a basic one piece camshaft (1) into the engine. FIG. 8b shows it is not possible to insert the camshaft (1) into the engine (9) if the camshaft lobes (4) were to have a larger radius than the camshaft bearing journals (3), since the camshaft lobe (4) then would hit the camshaft support bearing (2).

Figure 8:
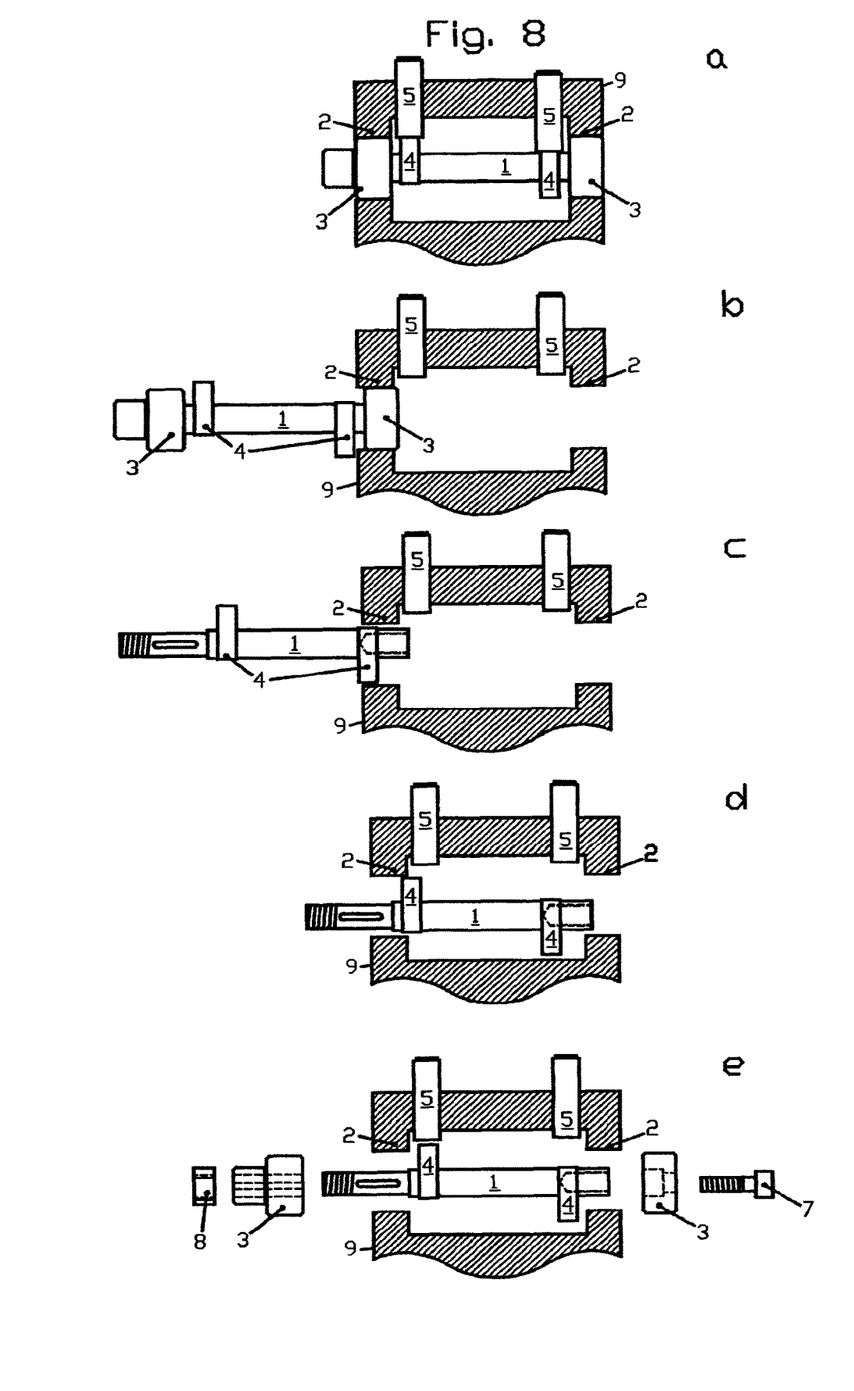

If at least one of the camshaft bearing journals (3) is made detachable it becomes possible, as shown in FIGS. 8 c-e, to radially displace the camshaft (1) when it is inserted through the camshaft support bearings (2). This makes it possible to insert a camshaft (1) where the radius of the camshaft lobes (4) are larger than the radius of the camshaft bearing journals (3). The camshaft bearing journals (3) are then joined to the camshaft (1) when it is in its position in the engine (9), in this case from each end as in FIG. 8e. The right camshaft bearing journal (3) is joined in its position with a bolt (7), centrally located in the bearing journal (3), while the left bearing journal (3), which in this case also should act as the driving flange of the camshaft (1), is angularly fixed to the camshaft (1) with a feather key, but it could alternatively be designed with splines 16, a pin 14 or a similar fastening element.

Figure 9:
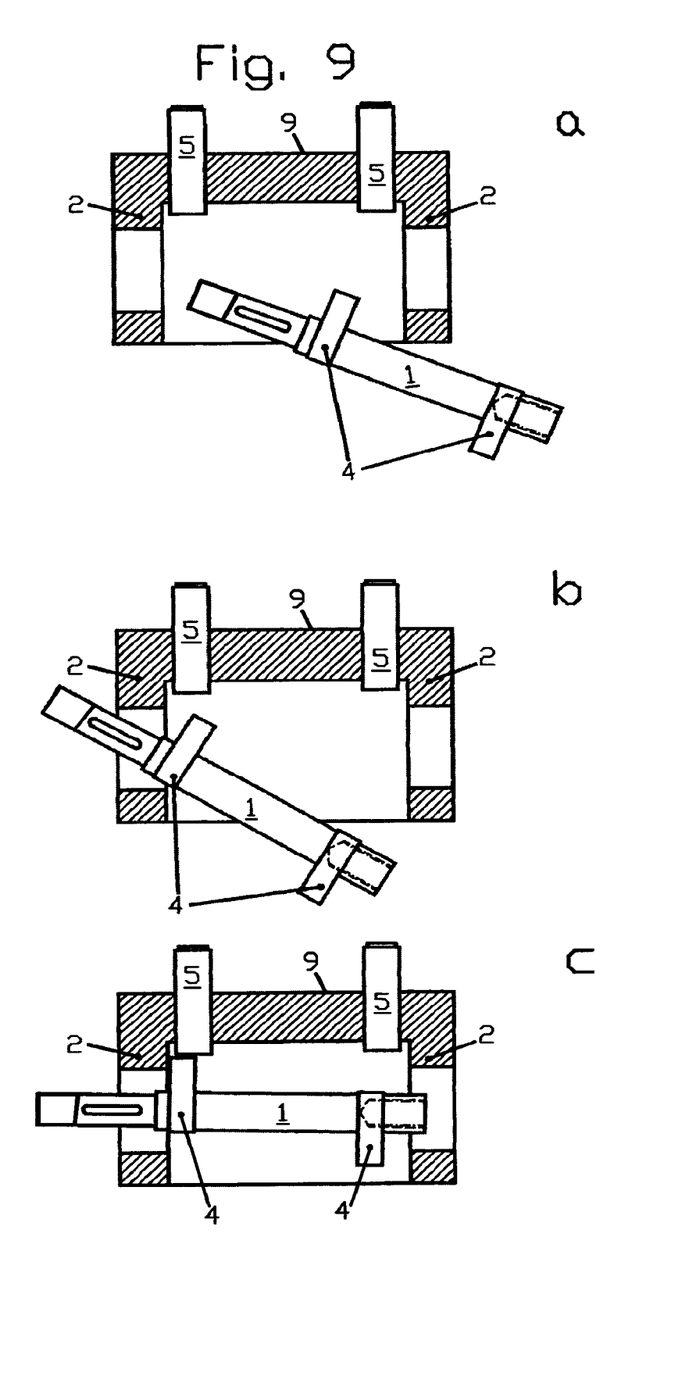

In some engine designs one side towards the camshaft (1) is open. If the camshaft (1) has detachable bearing journals (3) it then becomes possible to insert the camshaft (1) in the engine (9) through the open side as shown in FIG. 9 a-c, instead of inserting it through the camshaft support bearing (2). One side of the camshaft (1) is then first inserted at an angle into one camshaft support bearing (2) as shown in FIGS. 9 a-b, then placed in its horizontal position and finally pushed into the second support bearing (2). The camshaft bearing journals (3) can be assembled in a similar way as earlier described and shown if FIG. 8e.

This assembly method might be needed, for example, when the camshaft lobes (4) are close to each other and in different angular positions on the camshaft (1). They can then impose a similar problem as in between the bearing journals (3) and the camshaft lobe (4) and limit the possibility to radially displace the camshaft (1) when it is inserted through the camshaft support bearings (2).

In these types of designs the joints between the components might have to be designed with tapered holes and shafts. Then the components do not have to be in the exact right angular position towards each other during assembly, until they are positioned in their final position. It is sometimes necessary to be able to insert the components slightly angled at the start of the assembly.

The designs described up to now only have two camshaft bearing journals (3) and two camshaft lobes (4), in its simplest form a camshaft (1) can be made up of two bearing journals (3) and only one camshaft lobe (4). If the bearing journals (3) are placed close enough to each other, the same problem can occur in such a design as well.

More common though is that camshafts (1) are made up of more than two bearing journals (3) and more than two camshaft lobes (4). In those cases different combinations of the designs described might need to be used and the camshaft (1) might need to be divided into several components to make it possible to assemble after it has been inserted into the engine (9).

The following examples relate to a camshaft (1) with 3 bearing journals, but the principles used relates to all camshaft designs with 2 or more bearing journals.

Figure 5:
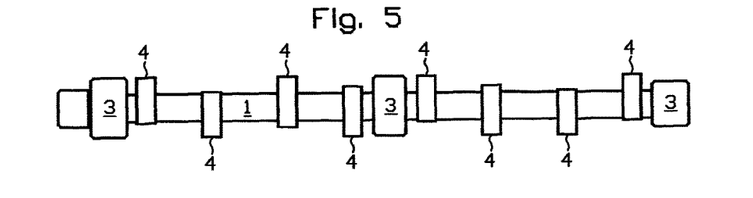
FIG. 5 shows a camshaft manufactured in one piece, or permanently assembled by several pieces when manufactured.

FIG. 5 shows the standard camshaft design of today in one piece, which shall be replaced.

Figure 7:
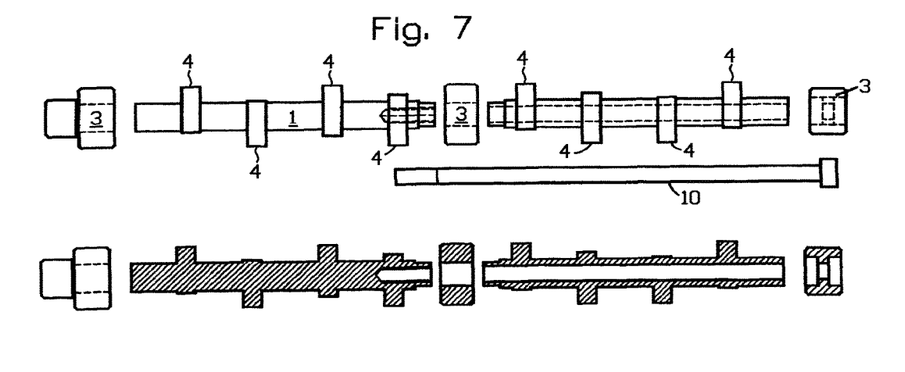
FIG. 7 shows a camshaft with 3 detachable bearing journals, all of them designed as sleeves, the camshaft being divided in the middle to make it possible to assemble.

FIG. 7 shows a design where the middle bearing journal (3) has been designed as a tubular sleeve and the camshaft (1) is parted into two components; and the components are fixed to each other in the sleeve at the same time the camshaft (1) is assembled into the engine (9). In this design the last bearing journal (3), to the right, can be made in one piece together with the camshaft (1) component, since it will be possible to assemble anyway. All the components in this design can be joined together by a long bolt (10) as joint if one of the axles is gun drilled and the other one is designed with a threaded hole.

If the camshaft (1) in FIG. 7 would have had more than 3 bearing journals (3) it would have to be divided at each bearing journal (3). For example a camshaft (1) with 5 bearing journals (3) will be divided into 4 axle components.

Figure 6:
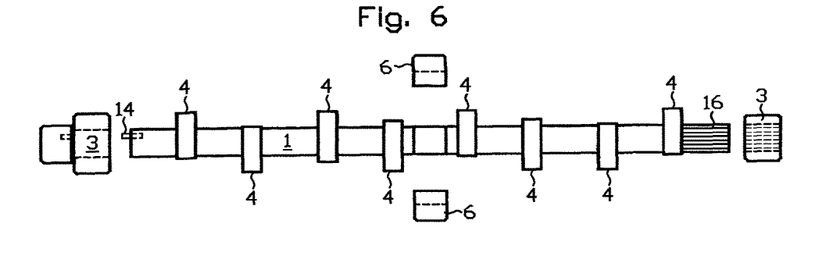
FIG. 6 shows a camshaft with 3 detachable camshaft bearing journals, the 2 outer bearing journals as sleeves, and the one in the middle radially divided into two parts.

A design solution shown in FIG. 6, demonstrates that it is not always necessary to divide the camshaft (1) even if the design has 3 or more bearing journals (3). In some designs it might instead be suitable to design the middle bearing journal (6) detachable. This is only possible if the bearing journal (6) is divided radially in two or more components, since it would otherwise be impossible to get the bearing journal (6) over the camshaft lobes (4). This technique becomes suitable mostly on the middle bearing journals (6) on camshafts (1) with 3 or more bearing journals (3).

The divided bearing journal components (6) can be fixed towards the camshaft (1) with bolt joints, riveting joints or some form of clamp joint. The outer bearing journals (3) are designed as sleeves and not divided radially. This is possible since they do not have to be assembled over any camshaft lobe (4) when assembled, they can be fixed to the camshaft (1) with, for example, a feather key or splines 16.

Figure 10:
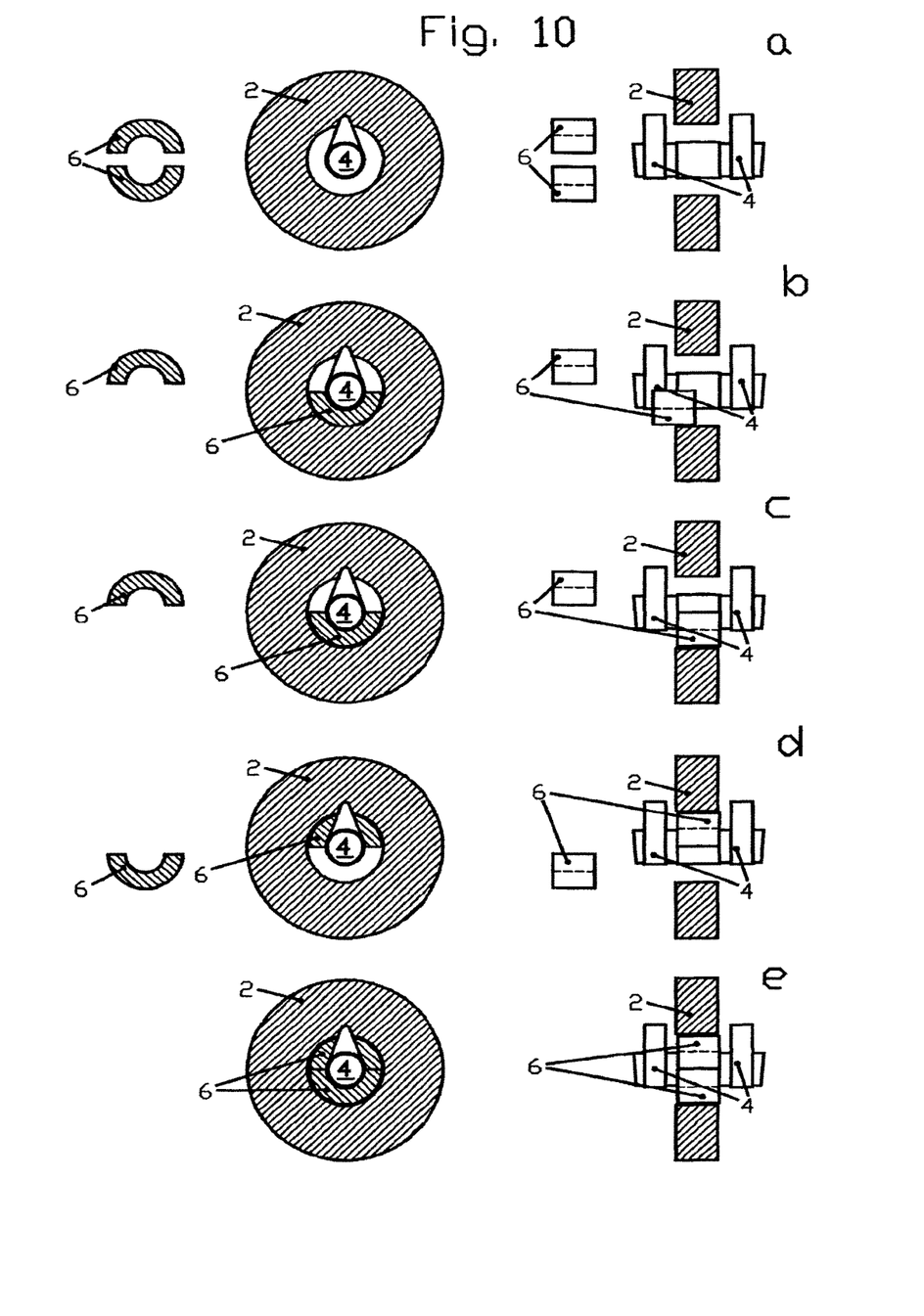

The assembly of the divided bearing journal (6) onto a camshaft (1) designed as described in FIG. 6, can be done as shown in FIGS. 10 a-e. One of the half bearing journal components (6) is axially inserted into its position according to FIG. 10b, which is possible on the opposite side to the camshaft lobe (4). When in place the divided bearing journal component (6) can be turned 180 degrees and positioned right beside the camshaft lobe (4) according to FIG. 10d. It then becomes possible to insert number 2 of the divided bearing journal components (6) in the same way as the first. When in its position the components can be fixed to the camshaft (1) or towards the camshaft support bearing (2).

Depending on how the bearing journal components (6) are fixed, the bearing surface becomes either on the outside or the inside of the divided bearing journal components (6). Another solution would also be to not fix the angular movement of the bearing journal (6) components such that both the outside and the inside become bearing surfaces.

Figure 11:
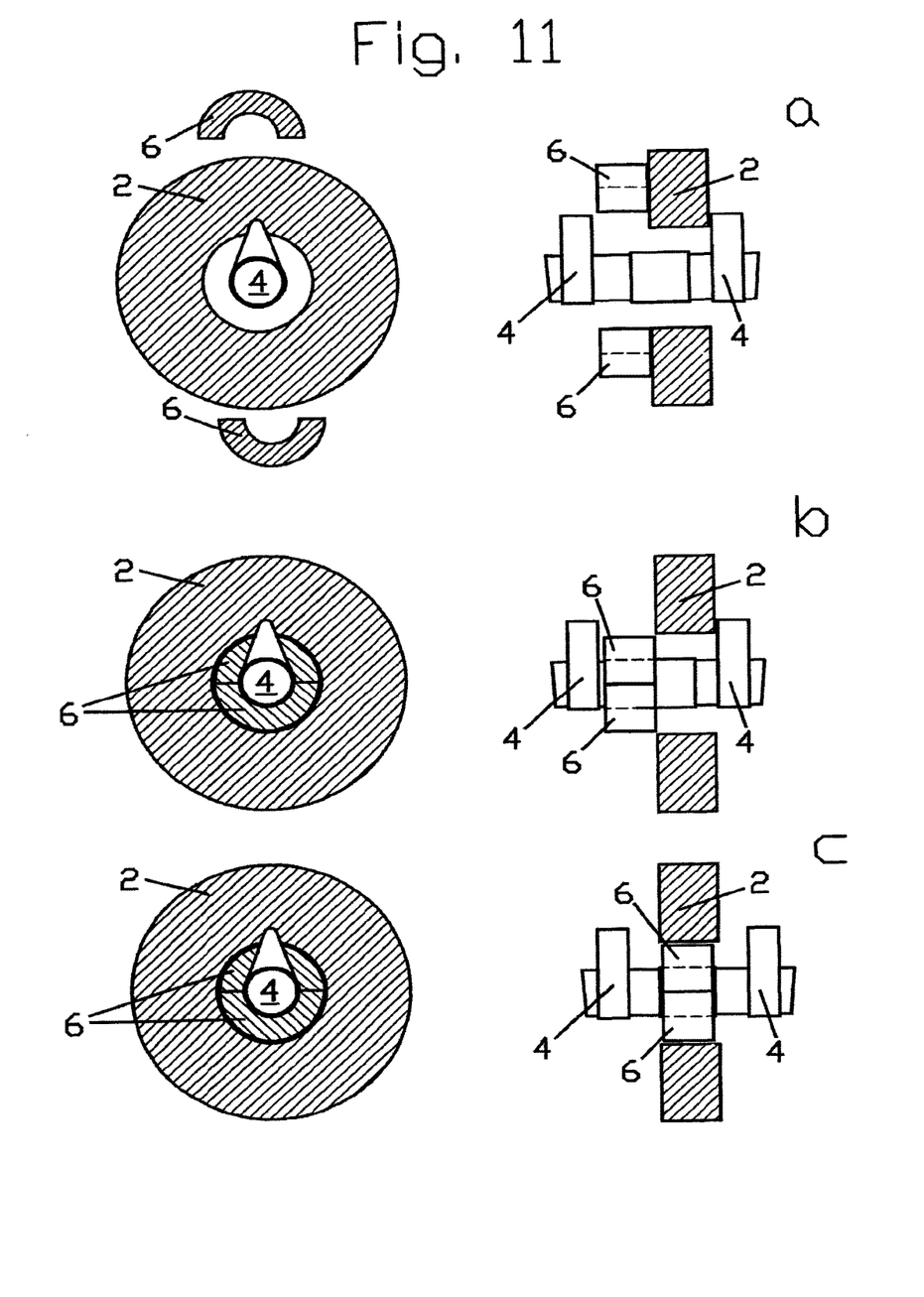

In some cases it might be possible to assemble all components of the radially divided bearing journal (6) at the same time as described in FIGS. 11a-c. One situation where that is possible is when the camshaft lobe (4) is positioned so far away from the bearing journal (6) that it is possible to insert the components in between the camshaft lobe (4) and the camshaft support bearing (2). In this case though there is no reason to make the bearing journal (3) detachable in the first place since it does not interfere when the camshaft (1) is inserted though the camshaft support bearings (2).

Another case is when it is possible to position the radially divided bearing journal components (6) before the camshaft (1) has reached its final position. There is then extra space for the bearing journal (6) between the camshaft lobe (4) and the camshaft support bearing (2). When in place, the camshaft (1) can be inserted into its final position according to FIG. 11c where the camshaft lobe (4) is closer to the camshaft support bearing (2).

The invention claimed is:

1. A camshaft consisting of at least one camshaft lobe and at least two camshaft bearing journals, wherein each of the at least two camshaft bearing journals relates to a camshaft support bearing which supports the camshaft, and at least one of the at least two camshaft bearing journals is separate from the camshaft for attachment to the camshaft when the at least one separate camshaft bearing journal is supported by its related camshaft support bearing, a maximum radius of each camshaft lobe being larger than an outer radius of the at least one separate camshaft bearing journal, the camshaft having an axial center and the camshaft characterized by being joined together with a joint extending in the axial center of the camshaft and through the center of the separate bearing journal, at least one of the at least two camshaft bearing journals being a sleeve.

2. A camshaft consisting of at least one camshaft lobe and at least two camshaft bearing journals, wherein each of the at least two camshaft bearing journals relates to a camshaft support bearing which supports the camshaft, and at least one of the at least two camshaft bearing journals is separate from the camshaft for attachment to the camshaft when the at least one separate camshaft bearing journal is supported by its related camshaft support bearing, a maximum radius of each camshaft lobe being larger than an outer radius of the at least one separate camshaft bearing journal, the camshaft having an axial center and the camshaft characterized by being joined together with a joint extending in the axial center of the camshaft and through the center of the separate bearing journal, at least one of the at least two camshaft bearing journals being radially divided into at least two parts.

3. A camshaft consisting of at least one camshaft lobe and at least two camshaft bearing journals, wherein each of the at least two camshaft bearing journals relates to a camshaft support bearing which supports the camshaft, and at least one of the at least two camshaft bearing journals is separate from the camshaft for attachment to the camshaft when the at least one separate camshaft bearing journal is supported by its related camshaft support bearing, a maximum radius of each camshaft lobe being larger than an outer radius of the at least one separate camshaft bearing journal, the camshaft having an axial center and the camshaft characterized by being joined together with a joint extending in the axial center of the camshaft and through the center of the separate bearing journal, the camshaft and at least one of the camshaft bearing journals being fixed to each other with a pin.

4. A camshaft, comprising:
a first camshaft bearing journal and a second camshaft bearing journal, the first camshaft bearing journal being detached from the camshaft, the detached bearing journal having an outer radius and a joint for connection to the axial center of the camshaft;
a first lobe having a maximum radius larger than the outer radius of the detached bearing journal; and
a second lobe having a maximum radius larger than the outer radius of the detached bearing journal.

5. A camshaft, comprising:
a first camshaft bearing journal and a second camshaft bearing journal, the first camshaft bearing journal being detached from the camshaft, the detached bearing journal having an outer radius and a joint for connection to the axial center of the camshaft; and
a first lobe having a maximum radius larger than the outer radius of the detached bearing journal;
wherein the second camshaft bearing journal has an outer radius equal to the outer radius of the first camshaft bearing journal.

6. A camshaft, comprising:
a first camshaft bearing journal and a second camshaft bearing journal, the first camshaft bearing journal being detached from the camshaft, the detached bearing journal having an outer radius and a joint for connection to the axial center of the camshaft; and
a first lobe having a maximum radius larger than the outer radius of the detached bearing journal;
wherein the second camshaft bearing journal is detached from the camshaft.

7. The camshaft of claim 6, further comprising at least a second lobe having a maximum radius larger than the outer radius of the detached bearing journal and wherein the second detached bearing journal is for attachment to the camshaft between the first lobe and the second lobe.

8. A camshaft, comprising:
a first camshaft bearing journal and a second camshaft bearing journal, the first camshaft bearing journal being detached from the camshaft, the detached bearing journal having an outer radius and a joint for connection to the axial center of the camshaft;
a first lobe having a maximum radius larger than the outer radius of the detached bearing journal; and
a pin for attaching the detached bearing journal to the camshaft.

9. A camshaft, comprising:
a first camshaft bearing journal and a second camshaft bearing journal, the first camshaft bearing journal being detached from the camshaft, the detached bearing journal having an outer radius and a joint for connection to the axial center of the camshaft;
a first lobe having a maximum radius larger than the outer radius of the detached bearing journal; and
a spline for attaching the detached bearing journal to the camshaft.

10. A camshaft, comprising:
a first camshaft bearing journal and a second camshaft bearing journal, the first camshaft bearing journal being detached from the camshaft, the detached bearing journal having an outer radius and a joint for connection to the axial center of the camshaft;
a first lobe having a maximum radius larger than the outer radius of the detached bearing journal; and
a third detached bearing journal.

* * * * *